United States Patent [19]

Dorman et al.

[11] Patent Number: 4,758,065

[45] Date of Patent: Jul. 19, 1988

[54] FIBER OPTIC SENSOR PROBE

[75] Inventors: Richard A. Dorman, Troy; Gregory Hull-Allen, Schenectady, both of N.Y.

[73] Assignee: Mechanical Technology Incorporated, Latham, N.Y.

[21] Appl. No.: 709,563

[22] Filed: Mar. 8, 1985

[51] Int. Cl.⁴ ............................................. G02B 23/26
[52] U.S. Cl. ............................. 350/96.26; 350/96.24; 350/96.25
[58] Field of Search ............... 350/96.10, 96.20, 96.24, 350/96.25, 96.26, 96.27, 96.29

[56] References Cited

U.S. PATENT DOCUMENTS 3,940,608  2/1976  Kissinger et al. ................. 350/96.24

Primary Examiner—William L. Sikes
Assistant Examiner—Robert E. Wise
Attorney, Agent, or Firm—Joseph V. Claeys; Joseph C. Sullivan

[57] ABSTRACT

A fiber optic sensor probe system comprises an electromechanical arrangement system which enables a fiber optic probe to lock onto a null point relative to a target which null point represents an in focus condition for the probe relative to the target. A servomechanism feedback circuit maintains the probe in an in focus condition relative to the target if the target moves. A dithering motion is provided to the probe such that, when the electrical output of the probe has a frequency component which is the same frequency as that of the dither, an out of focus condition of the probe relative to the target exists and the servomechanism feedback system operates to correct it. A monochromatic light source is used to eliminate the problem of different spectral components of light having slightly different focal lengths. A second dither or oscillation of the servomechanism's motor drive voltage causes the motor to oscillate and thus enables it to avoid becoming stuck by static friction, therefore enabling the system to achieve its proper null point. Finally, the geometry of the probe is such that the lens face is not parallel to the target, so that flat regions in the area of the null response point of the output curve of the probe which might cause the probe to hunt excessively for the null point are eliminated.

1 Claim, 8 Drawing Sheets

VARYING PROBE TO TARGET DISTANCE

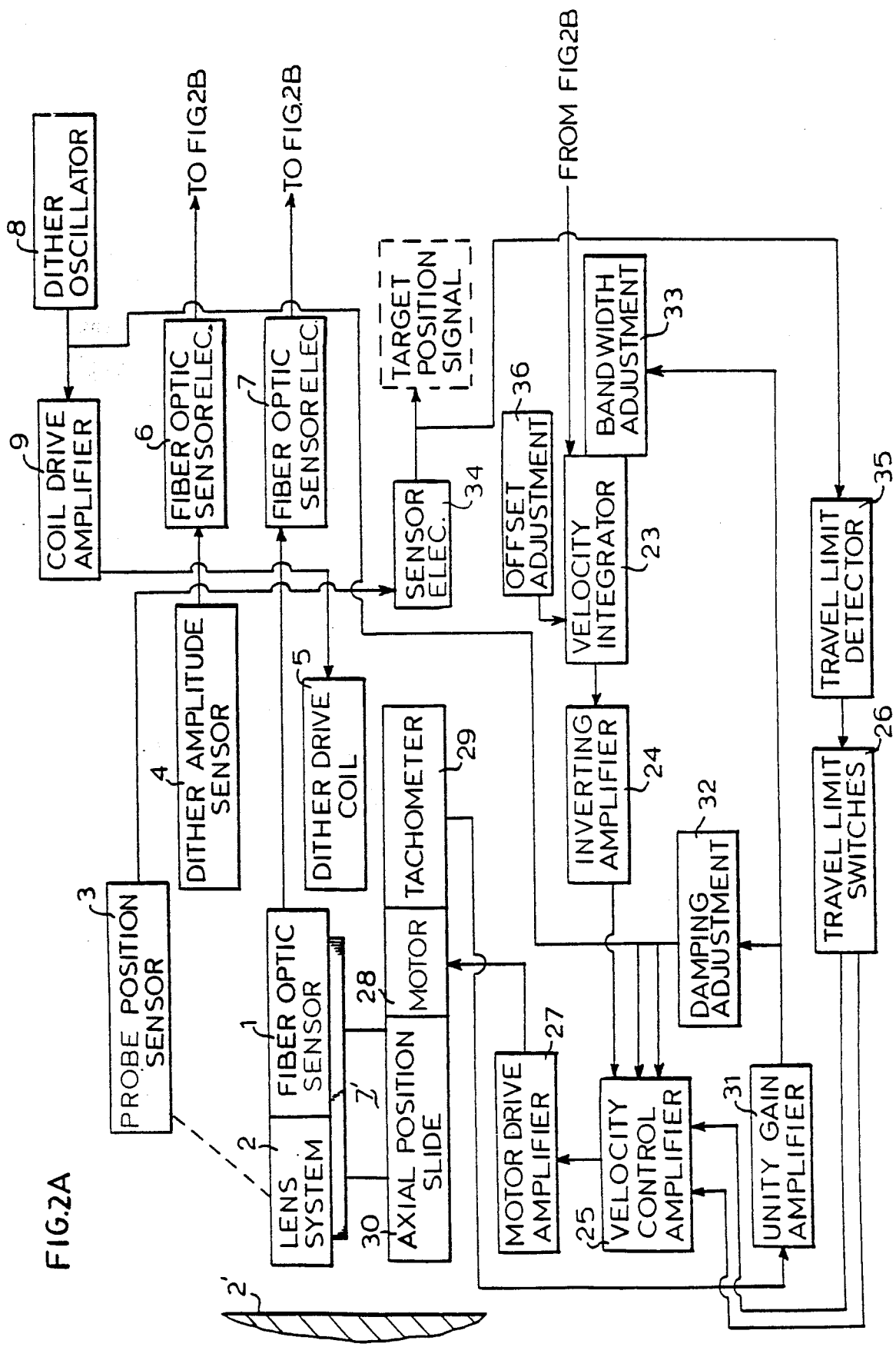

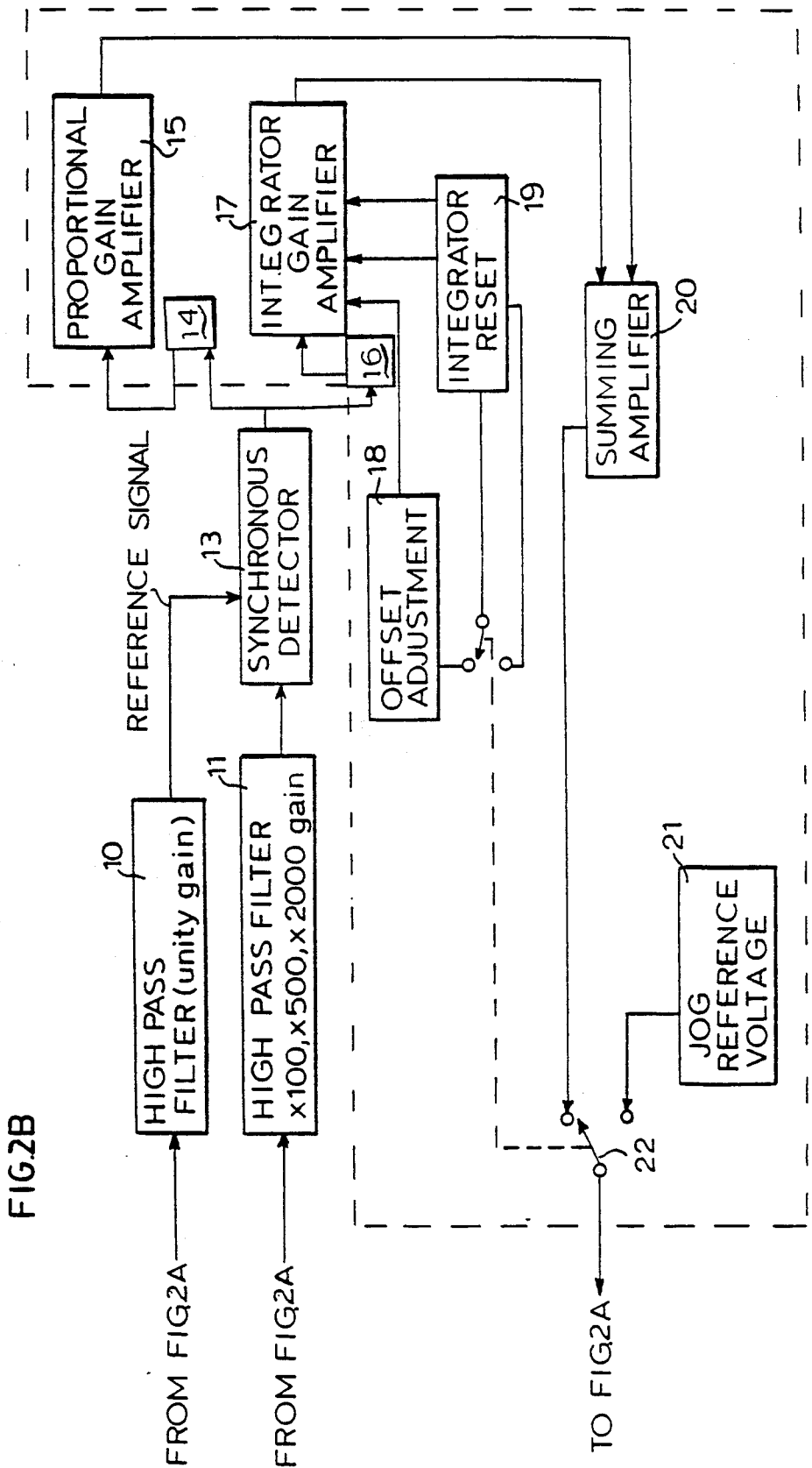

FIBER OPTIC SENSOR PROBE

FIELD OF THE INVENTION

The present invention relates to a proximity instrument and more particularly, to a fiber optic sensor with extender lens.

BACKGROUND OF THE INVENTION

The use of fiber optic proximity probes or fotonic sensors utilizing bifurcated fiber optic bundles and sensors and detectors to determine the distance to a target are well known. Such devices utilize a light beam transmitted from a light source by way of a bundle of light conducting optical fibers (transmit fibers) from a light source to a target. The light is reflected off the target and returned along other optical fibers (receive fibers) in the bundle back to a light intensity sensor. The intensity of the returned light is a function of the distance between the proximity probe tip and the target, so the output of the light sensor can be a very precise measure of that distance, or more importantly changes in that distance. Such a system is shown and described in U.S. Pat. No. 3,940,608 in which an extender lens is utilized.

SUMMARY OF THE INVENTION

In commonly assigned U.S. application Ser. No. 709,582 filed on even date herewith, entitled "Precision Optical Displacement Measuring Instrument Using Servo Controlled Fiber Optic Sensor", the teachings of which are incorporated herein by reference there is described a noncontacting displacement measuring instrument which utilizes a probe similar to that shown and described in U.S. Pat. No. 3,940,608. In the application for Patent, an electromechanical system is provided which enables a probe to lock onto the null point and remain in focus and follow the target. If the target moves toward or away from the probe, the entire sensor assembly moves in the same direction to maintain a focus lock condition. The movement of the probe is measured by means of a servo-loop system in order to determine the movement of the surface. The present invention provides an improved probe for use therein in which a monochromatic light source of unique configuration and a fiber optic probe of unique configuration are utilized and operated in a unique manner. More specifically, as stated previously, an electromechanical system is provided which enables a fiber optic probe to lock onto a null point relative to a target. The null point represents an in focus condition for the probe relative to the target. The electromechanical system comprises a servomechanism feedback circuit which maintains the probe in an in focus condition relative to the target if the target moves. A dithering motion is provided to the probe such that, when the output of the probe has a frequency component which is the same frequency as that of the dither, an out of focus condition of the probe relative to the target exits and the servomechanism feedback system operates to correct it. A monochromatic light source is employed to eliminate the problem of different spectral components of light having slightly different focal lengths. A second dither offset oscillation of the servomechanism circuits motor drive voltage causes the motor to oscillate and thus enables it to avoid becoming stuck by static friction. Finally, the geometry of the probe is such that the lens face is curved relative to the target so that flat regions in the area of the null response point of the output curve of the probe which might cause the probe to hunt excessively for the null point are eliminated.

BRIEF DESCRIPTION OF THE DRAWINGS

In the figures:

FIG. 2A, 2B is a more detailed diagrammatic illustration of the instrument shown in FIG. 1;

DESCRIPTION OF THE PREFERRED EMBODIMENT

Figure 1:
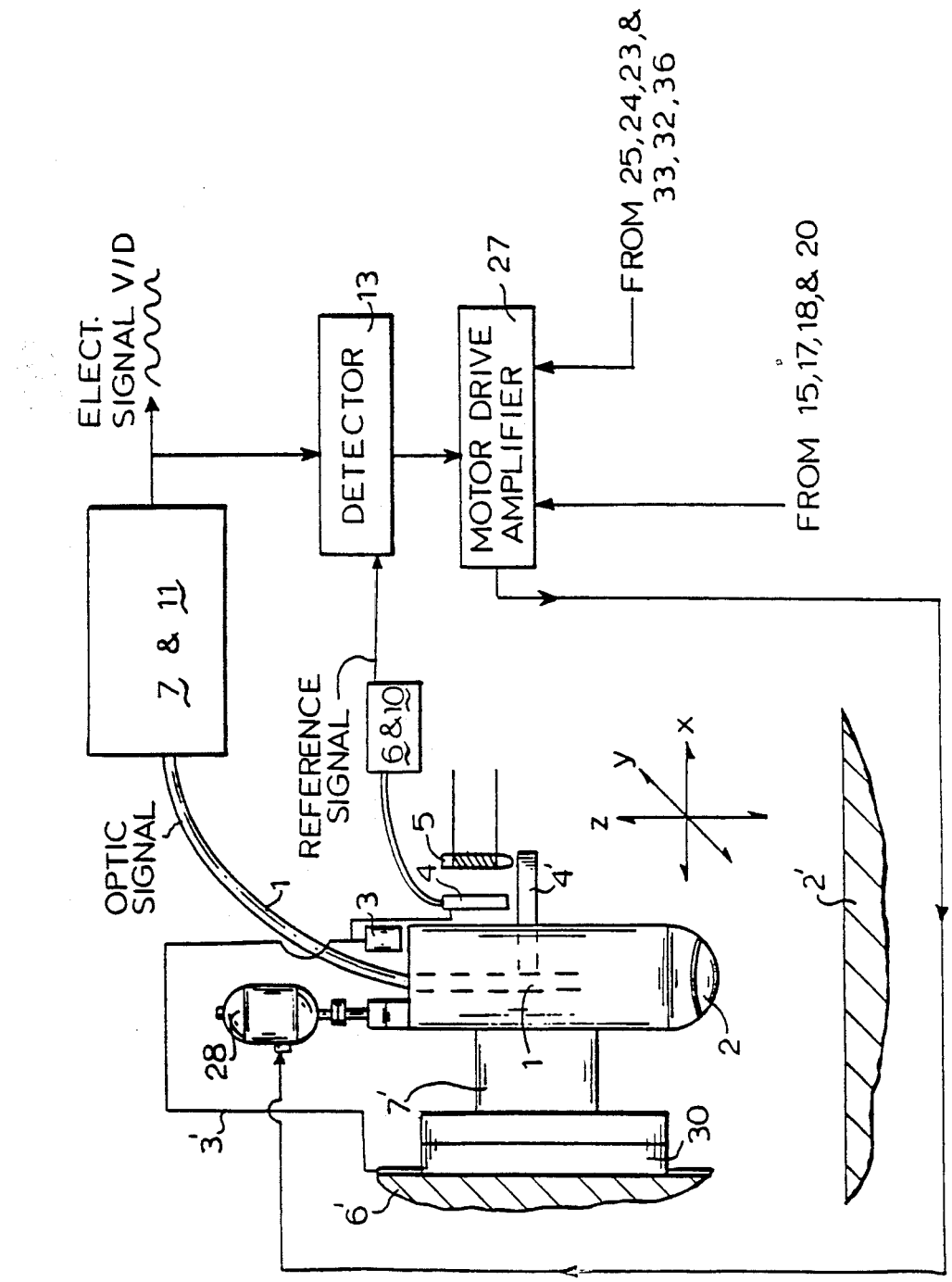
FIG. 1 is a simplified diagrammatic illustration of a proximity instrument incorporating the present invention.

The proximity instrument described in the aforesaid commonly assigned application utilizes a probe composed of a fiber optic sensor and a lens assembly such as that identified by the numerals 1 and 2 in FIG. 1. The sensor and lens combination has a response curve similar to that shown in FIGS. 3 and 4 which illustrate the change in the probe output signal with movement of the probe toward and away from the target. The sensor 1 and the lens 2 are coupled together so that a single mechanical structure results. The numeral 2' identifies the target.

In this invention the fiber optic sensor and lens assembly are vibrated in the direction of the probe axis, toward and away from the target. This is referred to as a dither. Vibration is accomplished by providing a mechanical structure 6' and an electromagnetic driver 5. An AC signal is applied to driver 5 and it provides a magnetic force to member 4' and forces the assembly to vibrate. Structural support 6' is the mechanical ground or reference or mechanical reference point. Spring means or flexure 7' allows the probe assembly to flex. The typical dither frequency is 100 Hz although it could be in the range from 10 Hz to 1000 Hz. This is typical but the frequency can be any reasonable selected frequency. The vibration amplitude is typically on the order of about 10 micrometer maximum.

Figure 3:
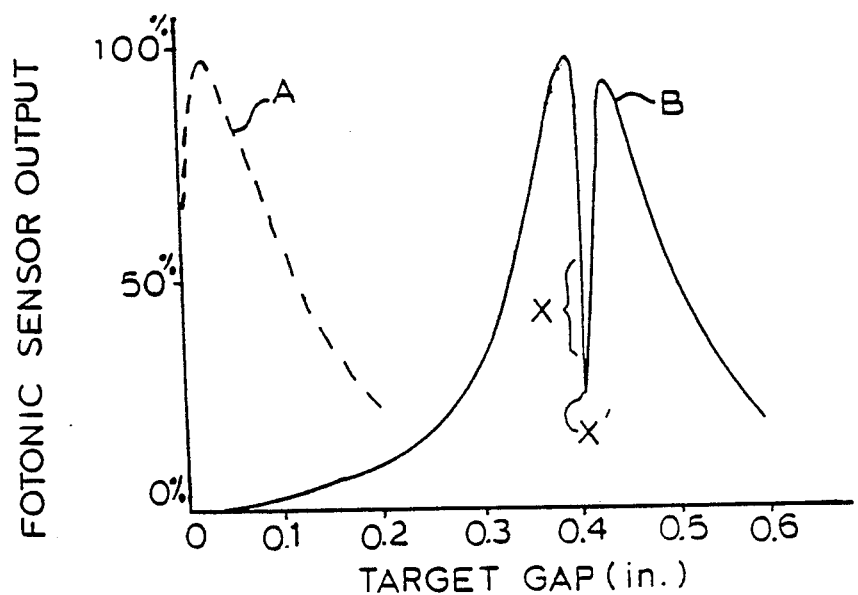
FIG. 3 is a graphical representation of the operation of the device.

Observing the response curve shown in FIG. 3 and labelled B, it is noted that the system works around the point of the null X'. When a dither is applied, the probe is actually oscillating back and forth around the null point X'. The fiber optic sensor electronics 7 provides an output voltage proportional to displacement. The output voltage is an AC signal caused by the dither motion. That AC signal will be twice the frequency of the dither. For example, if the system is off the null and was operating in the region X, a one-to-one relationship between the dither and the output is obtained and they would be the same frequency. However, dithering about the point X' as the mechanical dither goes negative away from X', the signal rises and as the mechanical dither goes positive away from X', it also goes positive. By virtue of operating on null, going up on both sides, the output is twice the frequency.

Curve A in FIG. 3 is provided for comparison and is the curve achieved by a fiber optic sensor without an optic lens as explained in the before identified U.S. Pat. No. 3,940,608. Numeral 7 and 11 in FIGS. 1 and 2 identify the electronics. Sensor 1 with associated electronics 7 and 11 provide a standard fiber optic sensor system. The optic signals are indicated as entering 7, 11 from the left in FIG. 1 and exiting as electrical signals. Electronics 7 is the standard fiber optic sensor electronics, the function of which is to convert the light output of electrical signals, somewhat similar to the teaching in U.S. Pat. No. 3,940,608, and electronics 11 is signal conditioning electronics added to amplify the AC dither signal.

The electronics 7, 11 provides an electrical output that allows for the obtaining of a measurable signal as shown in the FIG. 3. Whenever the target to probe distance changes, the electrical output of 7, 11 follows the curve B in FIG. 3. If the assembly is in the off-the-null condition at $X_o$, namely out of focus—and then dithered at that point, an output containing a component synchronous with the dither frequency appears at 7, 11 output. However, beginning to dither at X', in focus, because the transfer function reverses direction, the electrical output at 7, 11 will be twice the frequency of the dither and there will be no component synchronous with the dither frequency.

An error detection circuit 13 is shown in FIG. 1 at the output of 7, 11. When starting-up in focus and dithering, the output of 7, 11 is twice the frequency of the dither signal. If the target to probe distance changes slightly, there occurs an out of focus condition. The output of 7, 11 will still contain a signal which is twice the frequency of the dither but it will also begin to show a component, which is the same frequency as the dither, as the central point of the dither signal moves to one side of X'—the null point. A combination of signals results. The function of the error detection circuit 13 is to measure the amplitude of that fundamental signal, which is the frequency of the dither. That same frequency component is the fundamental and the fundamental frequency is the dither frequency. The function of 13 is to detect the value of the fundamental in the output at 7, 11. Dither amplitude sensor 4 and electronics 6 and 10 produce an AC signal proportional to and synchronous with the fundamental probe motion. This fundamental probe motion signal is a reference signal to detector 13. When the probe is in focus, the output of the detector 13 is zero. As it begins to go out of focus on either side, the output of the detector increases. The output of detector 13 has polarity such that the direction in which the target moves toward or away from the probe can be determined. The detector 13 is configured so as to measure only fundamental; accordingly any other signals may be filtered out. Essentially, detector 13 provides an output which signifies amount or distance out of focus and in which direction.

The output of detector 13 drives the motor 28 through motor drive amplifier 27 which moves the probe back to the null position thus closing the "loop" of the servo system. This brings the probe and lens into focus. Thus a servo system is provided which will position the probe to always be a fixed distance from target and essentially stay locked in focus.

Means are provided to measure the movement of the probe necessary to bring it back into focus. Displacement sensor 3 is provided which is mechanically referenced by means 3' to mechanical frame of reference or mechanical ground 6'. This prevents sensor 3 from having introduced into it, the movement of the dither or the movement of the probe. Sensor 3 can be for example, a displacement sensor such as an LVTD.

FIGS. 2A, 2B provide a more detailed overall view of the system shown in FIG. 1. The numerals used to identify components in FIGS. 2A, 2B are the same used to identify similar components in FIG. 1. Thus, numeral 1 is the fiber optic sensor; numeral 2 is the lens system. Components 7 and 11 shown in FIGS. 2A, 2B collectively convert the optical signal from the probe, first to an electrical signal indicating displacement, then a high pass filter to remove low frequency components.

The function of high pass filter 11 is to remove low frequency elements in the fiber optic probe signal below 50 Hz. Those elements would arise from the overall gross motion of the probe as it is following the target. The intent is to have the output of 11 contain just the signal elements which arise from the dither of the probe assembly. The dither sensor and electronics are identified by numerals 4, 6 and 10. To enable the error detection system to operate properly, it is necessary to measure the dither motion directly. That is done by adding another fiber optic sensor which is identified by the numeral 4. That is mounted such that it can measure the dither vibration of the probe assembly composed of sensor 1 and lens 2. Component 6 is a standard fiber optic sensor electronics similar to component 7. Component 10 is another high pass filter, the purpose of which is to condition the signal to contain only components resulting from the dither. Component 13 in FIG. 2B is a detector which receives the dither signal which is called the reference and the actual probe signal which is measuring the output of the probe 1 and 2 as it vibrates or dithers with respect to the target. The output of 13 provides an error signal which indicates how far the probe assembly composed of sensor 1 and lens 2 is off null in the optical response curve and it also indicates the direction from the null—either towards the probe or away from probe.

The detected distance signal which is the output of the detector 13 is amplified and phase shifted by the circuit composed of amplifier 15, integrator amplifier 17 and summing amplifier 20. This provides a velocity error signal that sets the value of motor velocity which is needed to drive the axial position slide 30 in a stable manner and maintain the lens to target gap a constant value. Component 14 is a gain adjustment for the proportional gain amplifier 15 and component 16 is a gain adjustment for the integrator 17. Numerals 14 and 15 designate an adjustable gain amplifier. Components 16 and 17 provide an adjustable integrating gain amplifier. These are all controls that allow the servo control system operation to be stable as the probe follows the target motion.

The closed loop signal actually passes through member 13 and then through components 14 through 20 and then back to the motor drive. Components 14 through 20 are circuit elements that provide integration and gain and summing. These provide for conditioning the signal to the desired velocity error signal.

Proportional gain adjustment 14 and the integrator gain adjustment 16 are included in the circuit to set the gain and phase-shift values to optimize the bandwidth and slew rate of the servo system.

The integrator reset circuit box 19, is used to reset or zero the integrator when the position control loop is opened with the jog servo-on-switch, number 22. Switch 22 and the jog reference voltage 21 are convenience features that are in the system. These all provide means of controlling the motor drive 28 which is a conventional rotational electric motor. The motor 28 is coupled to a gear reducer in one embodiment. It has a 30/1 ratio and a flexible coupling between. The output of the gear reducer drives a lead screw which is connected to a nut which is on the position slide. Motor drive amplifier 27 provides a voltage output which controls the speed and direction of rotation of the motor drive 28 and causes the slide 30 to traverse back and forth. It moves the probe assembly composed of sensor 1 and lens 2 towards or away from the target. The control of the rotational speed of motor 28 is accomplished by the feedback system composed of integrator 23, inverting amplifier 24, velocity control amplifier 25 and the motor drive amplifier 27. The feedback system is closed through tachometer 29. The output of the tachometer 29 goes to amplifier 31 which feeds back to components 32 and 33.

Components of the velocity control system are configured to produce a motor speed that will follow the voltage output of the summing amplifier in a stable manner. The output of 20, the summing amplifier, is an error signal. If it goes plus or minus, it creates an output through the path from components 22 through 27 which causes the motor to move and the system senses that movement via the tachometer 29 which provides a signal back into the amplifier 31. Components 32 and 33 are additional adjustments to set up the servo-loop. These components provide a damping adjustment, and a bandwidth adjustment for the control of the motor velocity. The offset adjustment 36 provides a means of setting the motor speed to zero when there is zero voltage value at the output of the amplifier 20.

There is also provision for limiting the axial motion of the slide to prevent the entire system from travelling to the extreme end of the travel and running into the mechanical limit of slide 30. Travel limit detector 35 derives a signal from sensor 3. This is used to provide a sensor which measures the overall movement of the probe assembly. It could be any kind of displacement sensor such as an LVDT a capacitance probe. The output of component 3 is fed to signal conditioning electronics to provide a voltage proportional to the displacement that is measured. The sensor electronics are provided in component 34. That output is fed to component 35 in which limits can be set on the voltage which correspond to travel limits of the axial position slide such as making the gain of velocity control amplifier 25 zero for drive signals that will cause motion beyond the travel limit. There are different ways that this can be implemented. It could use only the voltage limits in the detector; it can also have mechanical switches at stop points in the probe such as component 26 or a combination of both. If the mechanical or the voltage limits are exceeded, signals are provided to component 25, the velocity control amplifier, to cause the motor to stop moving. Generally, there is then some action required on the part of the operator to come back and through the manual jog capability to reposition the system back into normal operating range.

In operation dither oscillator 8 creates an AC signal typically around 100 Hz which is fed to coil drive amplifier 9 to drive electromagnetic coil 5 which is an electromagnetic device which causes an AC magnetic force which couples to the flexures shown between the probe assembly 1, 2 and the axial position slide 30 causing the probe assembly, 1 and 2, to vibrate about the focus distance point in a direction perpendicular to the target. The fundamental of the vibration is detected when the central point of the dither is no longer the focus distance point upon change in distance between probe and target and through the servo-loop the in focus position of the probe is restored with the required movement for restoration of focus determined to provide an output signal which is a measure of the position of the target with respect to the probe.

A further improvement is included herein wherein a dither is applied to the motor drive which is not the dither on the probe referred to elsewhere.

It is noted that the drive motor, reduction gear and lead screw have friction inherent in them which causes some drag and hysteresis in operation as the motor moves back and forth. This can cause what is known as a deadband in the system response which adversely affects the response of the system. It displays an inherent instability as it tries to home in on a particular null point. It hunts to a degree that is unacceptable. The amplitude of the hunt is greater than the desired accuracy. The solution to this problem as taught herein involves imposing a small amount of dither or oscillation on the motor drive voltage. This is in addition to the dither discussed above. This causes the motor to oscillate or vibrate rotationally and enables it to avoid becoming stuck by static friction and enables the system to average its response and achieve the proper null point. The result is that the stability of the system output is improved to acceptable limits. This is accomplished by an electronic oscillator which produces a 100 Hz AC signal which is applied to the motor drive circuit.

In FIG. 2A, 2B, dither oscillator 8 provides the dither signal for the original dither drive. That same signal is also provided to velocity control amplifier 25 for the motor drive amplifier 27. In effect, there has been added to the motor drive signal a 100 Hz AC signal which appears at the output of motor drive amplifier 27 which forces the motor to continuously oscillate.

A white light source which is normally used in fiber optic sensors, has light at many frequences, many colors. White light is made up of many spectral components. This can, under certain circumstance be undersirable and lead to a problem in the operation of the sensor system in that the optical elements have a characteristic known as chromatic aberration. Different spectral components, different light frequencies, are effected differently by the lens. The lens has a different index of refraction for each of those components. The equivalent focal length for the lens is in fact a slightly different number for each spectral component.

Figure 4:
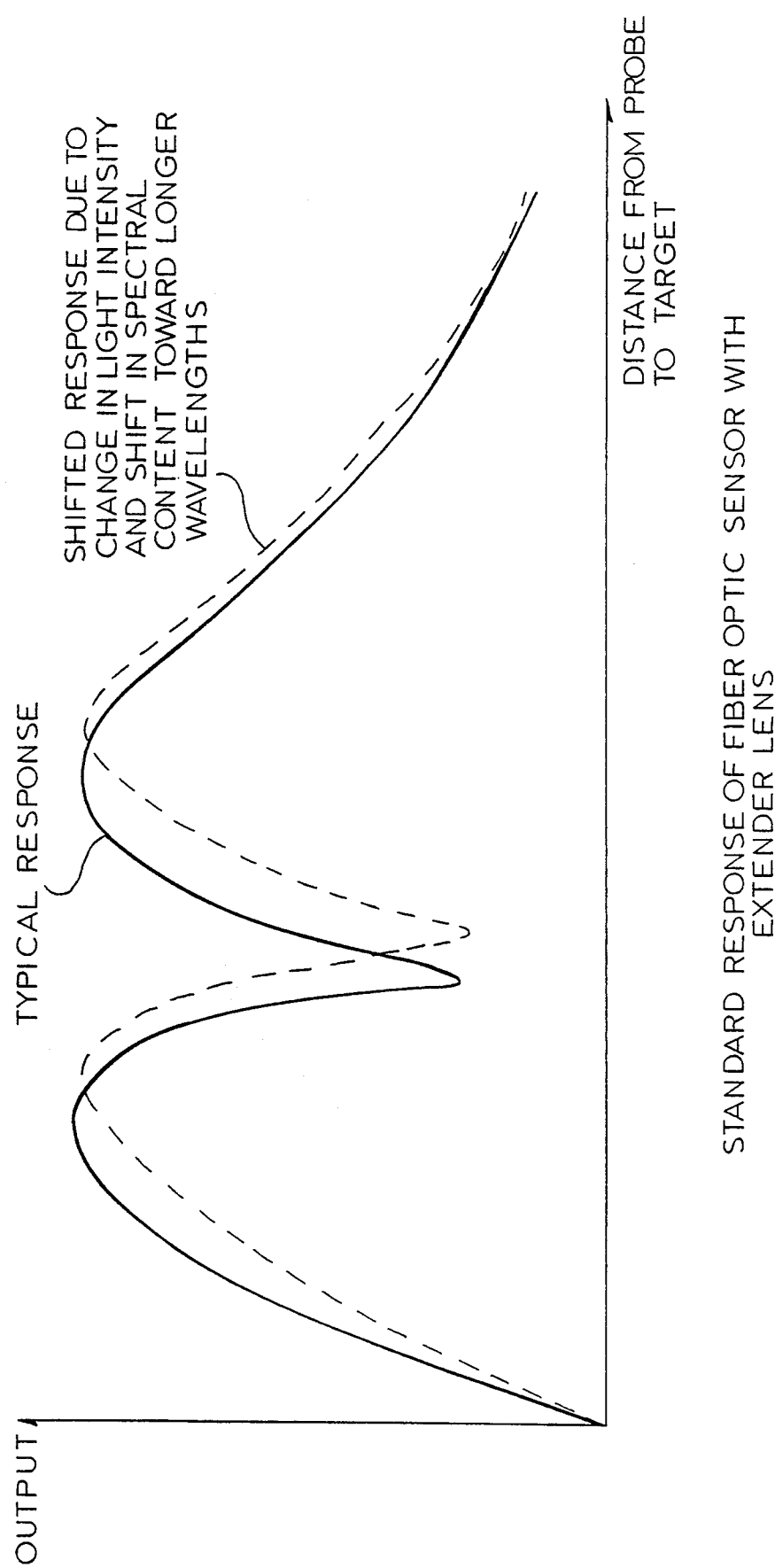
FIG. 4 is a graphical representation of the response of a typical fiber optic sensor with extender lens.

Typical light sources which are used have spectral properties which change over time. The temperature of the light source changes with time and the mixture of the colors emitted by the source will change. That change causes a change in the overall system transfer characteristic. This is illustrated in FIG. 4 wherein two response curves are shown which show a shift in the null position due to the change in the white light spectral content.

This is an undesirable characteristic in that it shifts the position of the null and causes a direct error output of the system. It has been found that to substitute a monochromatic light source, one with a single frequency light source E.B., an LED for the white light source, the spectral characteristic of that light source remains constant over time. There is therefore no shift of the null as appears with the white light source. This leads to an improved stability and accuracy of system performance.

Devices which are available for providing the monochromatic light, are limited in the amount of light output they can deliver however. If the device is used with a constant voltage or current applied to give it constant light output, the amount of light which is delivered through the fiber bundle and into the target and back, is insufficient to allow the system to operate properly. Not enough light is delivered. A method of dealing with that problem has been determined which is to, in effect, turn the light source on and off at a high rate of speed, for example a 2 kHz rate with a 10% duty cycle. This allows a peak light output which is much greater than the light output with a constant voltage or current applied while maintaining the average power dissipated in the light source and not burning it out. This enables sufficient light to be received from the monochromatic source to make the system operate.

Figure 5:
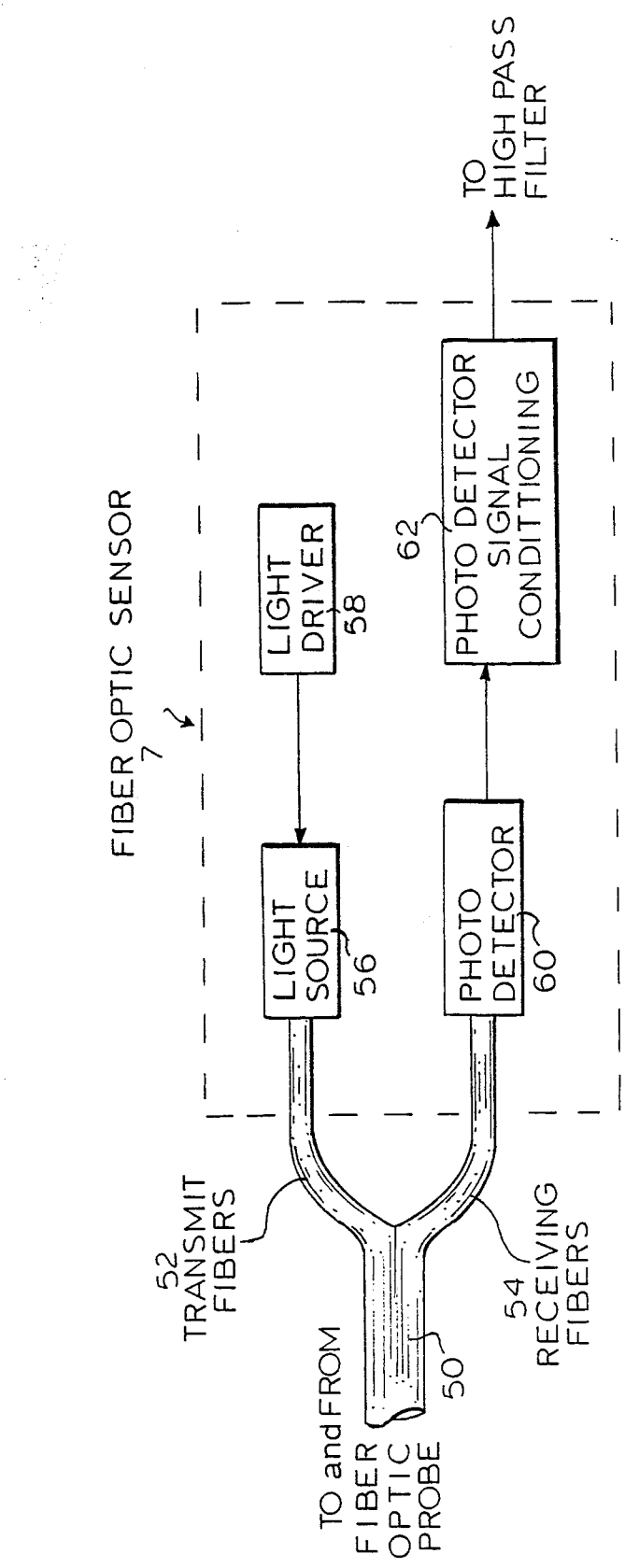
FIG. 5 is a diagrammatic illustration of a fiber optic sensor of the type with which the present invention can be used.

FIG. 5 illustrates certain components contained in the block 7 of the aforesaid application entitled "Precision Optical Displacement Measuring Instrument Using Serve Controlled Fiber Optic Sensor."

In FIG. 5 there is shown light source 56, light driver electronics 58, photo detector 60, and photodetector signal conditioning electronics 62 associated with the light detector 60 and which provides the output for the box 7. Further shown is fiber optic bundle 50. The numeral 52 is the transmit portion of the fiber bundle and 54 is the receive portion of the fiber bundle.

Figure 6:
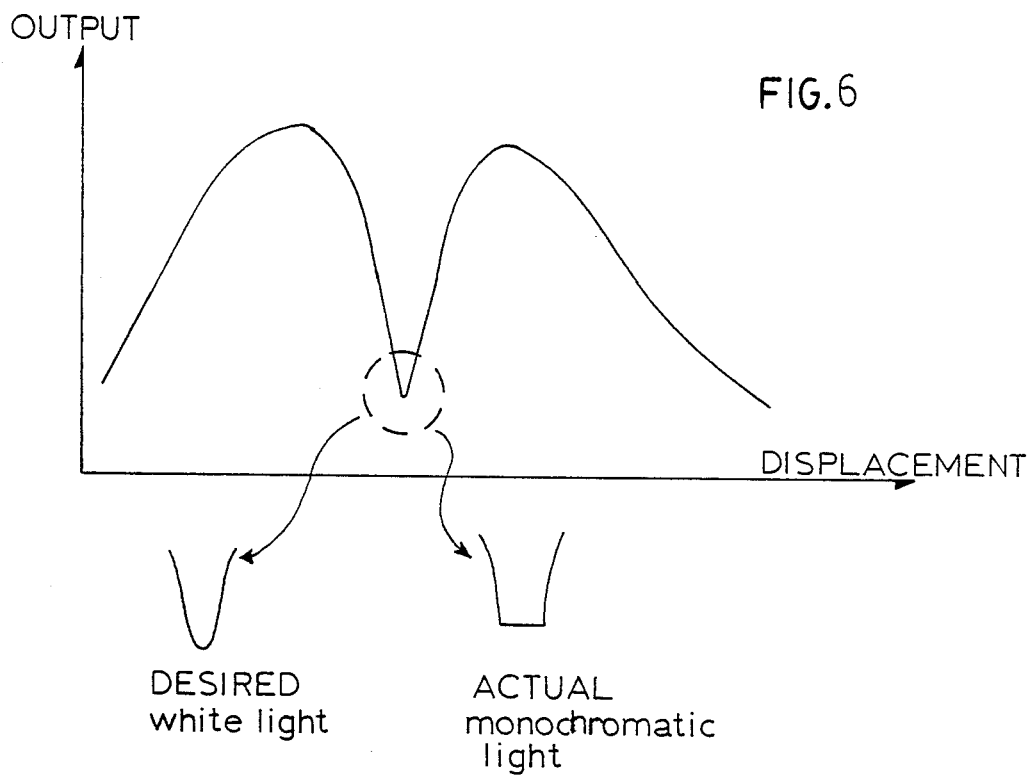
FIG. 6 is a graphical illustration of an output curve.
Figure 7:
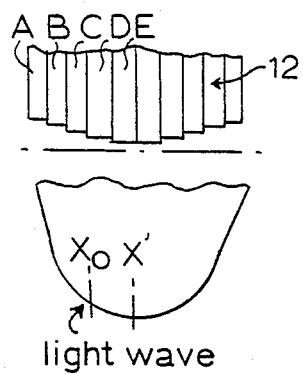
FIG. 7 shows a probe configured in accordance with the teaching of this invention with the portion above the broken line illustrating individual responses A-E and the portion below the broken line illustrating the summed response.
Figure 8:
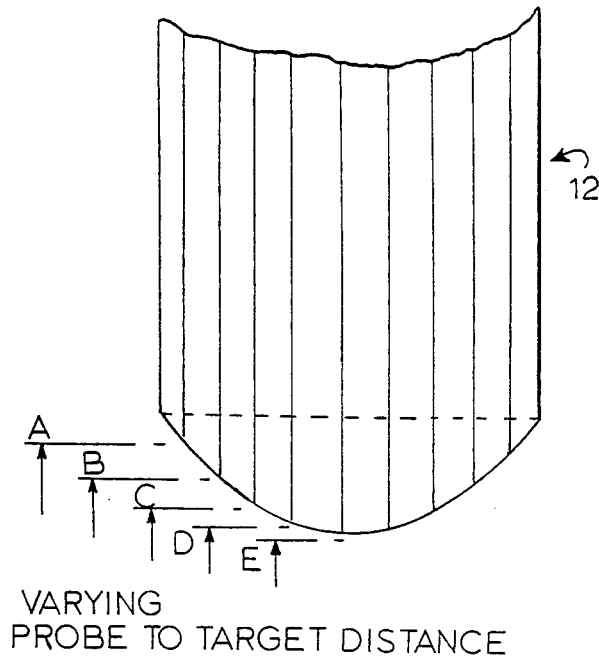
FIG. 8 shows a probe configured in accordance with the teaching of this invention illustrating the effect of varying probe to target distance of individual fibers.

When a monochromatic light source is used, a new problem is created which causes this system to operate with less than desired performance. Reference is now made to FIGS. 6, 7 and 8.

Figure 9:
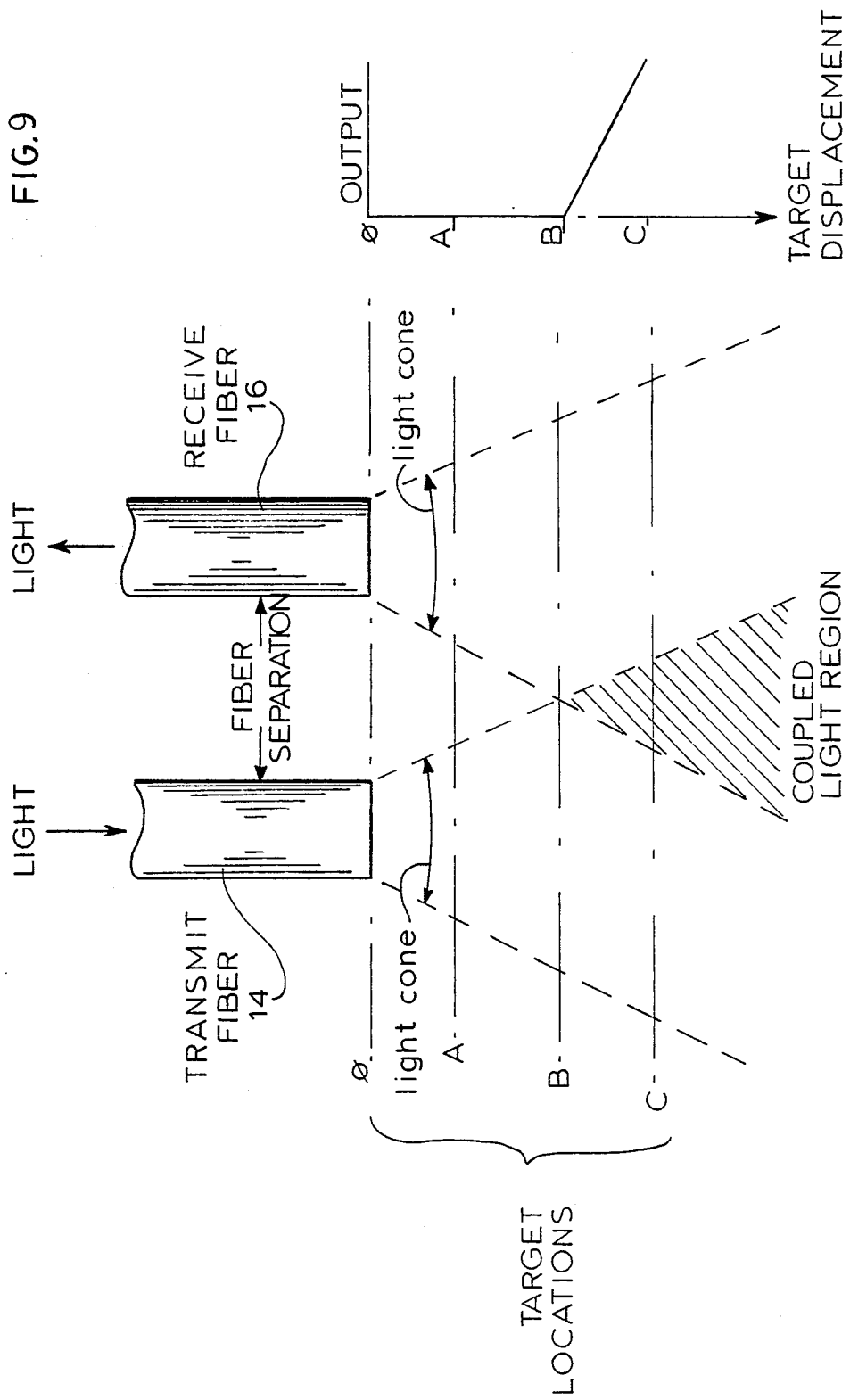
FIG. 9 is a graphical illustration of light emitted and received at the fiber end.

The null response of the fiber optic probe normally is shown as having a sharp inverted peak to it. When the monochromatic light source is used, the null response exhibits a flat region at the bottom. The result of this is that when the system is in a focus condition at the null it does not have a unique single position to return to due to the flat null curve. The system then can tend to hunt. This causes an instability or wandering in the output of the instrument. The magnitude of the instability can be undesirable. The reason that that flat exists can be explained in reference to FIG. 9. In fact, the transmitter and receive fibers do not touch; there is some finite separation between them due to the cladding which is on the fibers and also the random spaces which exist when a bundle of fibers is held together. This means that in the region close to the focus point, there is a finite region on either side of focus by which the distance can change, and there still is no coupling of the light from transmit to receive fibers. That is the mechanism which leads to the existence of the flat region. It has been found that by modifying the geometry of the probe face such that the face is no longer flat or parallel to the target, the flat region in the null response can be eliminated. The non-flat, or non-planar condition can take on a number of different forms. The one that is shown in FIGS. 7 and 8 is a somewhat rounded case. It could be slanted or conical or whatever as long as it is non-planar. This creates what can be viewed as many separate probes assembled together and each probe has a slightly different standoff distance. Therefore, each probe has a different response characteristic. FIG. 7 and 8 provide an example showing probe 1, 2 where different fibers exhibit different probe characteristics, each with different positions of its null. In the overall probe assembly, these are summed and tend to give a composite response curve which does not contain the flat region.

We claim:

1. In an improved fiber optic sensor prove, a monochromatic light source positioned adjacent to said sensor probe in that said light source is in one branch of a bifurcated fiber bundle and said sensor probe is in the other branch, and means for energizing and de-energizing said light source in cyclic manner, said sensor probe having a non-planar face spaced from a target in non-parallel relationship to receive reflected monochromatic light therefrom, said target spaced from said monochromatic light source for receiving monochromatic light therefrom.

* * * * *